(12) United States Patent
Kimbara et al.

(10) Patent No.: US 7,418,782 B2
(45) Date of Patent: Sep. 2, 2008

(54) METHOD OF MANUFACTURING A GAS STORAGE TANK

(75) Inventors: Masahiko Kimbara, Okazaki (JP); Daigoro Mori, Mishima (JP); Takehiro Nito, Toyota (JP); Hidehito Kubo, Kariya (JP); Akiko Kumano, Kariya (JP); Makoto Tsuzuki, Kariya (JP); Yoshihiro Isogai, Kariya (JP)

(73) Assignees: Toyota Jidosha Kabushiki Kaisha, Toyota (JP); Kabushiki Kaisha Toyota Jidoshokki, Kariya (JP)

( * ) Notice: Subject to any disclaimer, the term of this patent is extended or adjusted under 35 U.S.C. 154(b) by 593 days.

(21) Appl. No.: 10/806,163

(22) Filed: Mar. 23, 2004

(65) Prior Publication Data

US 2005/0000970 A1    Jan. 6, 2005

(30) Foreign Application Priority Data

Mar. 25, 2003  (JP)  .............................. 2003-081704
Mar. 25, 2003  (JP)  .............................. 2003-081706

(51) Int. Cl.
*B21D 53/02*  (2006.01)
*F17C 1/08*  (2006.01)

(52) U.S. Cl. ...................... 29/890.03; 29/455.1; 29/423; 206/7; 206/6; 148/637; 220/592

(58) Field of Classification Search .............. 29/890.03, 29/454, 455.1, 423; 206/7, 6; 148/637, 644, 148/698; 96/108
See application file for complete search history.

(56) References Cited

U.S. PATENT DOCUMENTS 3,006,153 A * 10/1961 Cook .......................... 62/46.3
4,045,861 A    9/1977 Zahid
4,393,924 A    7/1983 Asami et al.
6,015,065 A    1/2000 McAlister
6,755,919 B2 * 6/2004 Toyooka et al. ............. 148/325
2003/0209148 A1  11/2003 Myasnikov et al.

FOREIGN PATENT DOCUMENTS

| DE | 42 01 131 A1 | 7/1992 |
|---|---|---|
| EP | 1 286 406 A2 | 2/2003 |
| EP | 1 286 407 A2 | 2/2003 |
| JP | A 51-109514 | 9/1976 |

(Continued)

*Primary Examiner*—David P. Bryant
*Assistant Examiner*—Sarang Afzali
(74) *Attorney, Agent, or Firm*—Oliff & Berridge, PLC

(57) ABSTRACT

The technique of the invention manufactures a gas storage tank, which includes a gas absorbent/adsorbent and is capable of storing a high-pressure gas. The manufacturing process of a hydrogen storage tank first assembles a heat exchanger unit and packs the particles of hydrogen storage alloy into the heat exchanger unit. The manufacturing process then blocks hydrogen storage alloy filling holes used for packing the hydrogen storage alloy in the heat exchanger unit and attaches a detachable cover member to a hydrogen inlet. The manufacturing process subsequently locates the heat exchange unit filled with the hydrogen storage alloy in a cylindrical tank and narrows both ends of the tank to form joint openings. The manufacturing process then heat-treating the tank under water cooling and detaches the cover member. The manufacturing process attaches joint assemblies to the joint openings and forms a reinforcement layer around the outer circumference of the tank to complete the hydrogen storage tank.

6 Claims, 12 Drawing Sheets

FOREIGN PATENT DOCUMENTS

| | | |
|---|---|---|
| JP | A 59-146901 | 8/1984 |
| JP | A 62-204099 | 9/1987 |
| JP | 62258996 A * | 11/1987 |
| JP | 64-031381 | 2/1989 |
| JP | 64-031383 | 2/1989 |
| JP | A 04-243901 | 9/1992 |
| JP | A 05-106792 | 4/1993 |
| JP | A 11-104762 | 4/1999 |
| JP | A 2000-055300 | 2/2000 |
| JP | A 2000-170998 | 6/2000 |
| JP | A 2000-233245 | 8/2000 |
| JP | A 2002-340430 | 11/2002 |
| KR | 0166608 B1 | 3/1999 |
| WO | WO 98/53246 | 11/1998 |

* cited by examiner

METHOD OF MANUFACTURING A GAS STORAGE TANK

BACKGROUND OF THE INVENTION

1. Field of the Invention

The present invention relates to a gas storage tank for storing gas therein and a method of manufacturing such a gas storage tank.

2. Description of the Related Art

Various gas storage tanks have been proposed to store a gas. One known method for storage of a gas is absorption or adsorption of the gas in a selected gas absorbent/adsorbent. One example is a hydrogen storage tank including hydrogen storage alloy. The hydrogen storage tank includes, for example, a cylindrical container that is filled with the hydrogen storage alloy and has one or two opening ends sealed by a flange.

In the gas storage tank containing the gas absorbent/adsorbent, an increase in gas supply pressure to the gas storage tank accelerates absorption or adsorption of the gas. The increase in gas supply pressure to the gas storage tank enables a larger quantity of the gas to be stored in a compressed form in cavities formed in the gas storage tank, in addition to absorption or adsorption of the gas in the gas absorbent/adsorbent. The gas storage tank is required to have a sufficiently high strength against the higher pressure in the gas storage tank. The high internal pressure of the gas storage tank may cause difficulties in sealing the opening of the container with the flange or in keeping the sufficient airtightness of the container with a gasket. No intensive studies, however, have been made on the structure of the gas storage tank that is filled with the gas absorbent/adsorbent and is capable of storing a high-pressure gas.

SUMMARY OF THE INVENTION

The object of the invention is to eliminate the drawbacks of the prior art technique and to provide a technique of manufacturing a gas storage tank, which ensures sufficient performance of a gas absorbent/adsorbent included therein and is capable of storing a high-pressure gas.

In order to attain at least part of the above and the other related objects, a first application of the present invention is directed to a method of manufacturing a gas storage tank for storing a gas. The manufacturing method of the first application includes the steps of: providing a hollow filling unit and a metal outer wall member, which receives the filling unit therein; filling the filling unit with a gas absorbent/adsorbent for absorbing and/or adsorbing the gas; attaching a detachable cover member to the filling unit to block up an opening of the filling unit filled with the absorbent/adsorbent, and placing the filling unit filled with the absorbent/adsorbent into the outer wall member through an opening formed in the outer wall member; narrowing the opening of the outer wall member after the placement of the filling unit into the outer wall member; heat-treating the outer wall member with the narrowed opening under water cooling; and detaching the cover member from the filling unit housed in the outer wall member after the heat treatment and connecting inside of the filling unit with outside of the outer wall member via the narrowed opening of the outer wall member, so as to allow for storage and release of the gas into and from the absorbent/adsorbent.

The manufacturing method of the gas storage tank of the invention attaches the detachable cover member to the filling unit to block up the opening of the filling unit, which is filled with the absorbent/adsorbent, prior to heat treatment. This arrangement effectively prevents the absorbent/adsorbent packed in the filling unit from being wet in the water cooling step of the heat treatment. It is extremely difficult to dry up the wet absorbent/adsorbent after packing in the filling unit. Once being wet, the absorbent/adsorbent may lower its gas absorbing/adsorbing capacity. Attachment of the detachable cover member to the filling unit effectively prevents such potential problems of the absorbent/adsorbent. After the heat treatment under water cooling, the cover member is removed from the filling unit to reopen the opening of the filling unit. The opening of the filling unit functions as a gas channel for storage and release of the gas into and from the absorbent/adsorbent packed in the filling unit.

The manufacturing method of the gas storage tank of the invention narrows the opening of the outer wall member, after the placement of the filling unit into the outer wall member. This arrangement assures the sufficient size of the opening of the outer wall member for smooth placement of the filling unit into the outer wall member. After the insertion of the filling unit, the opening of the outer wall member is narrowed to keep the sufficient airtightness of the outer wall member against the inner gas pressure. The manufacturing method packs the absorbent/adsorbent into the filling unit, prior to the placement of the filling unit into the outer wall member and the narrowing of the opening of the outer wall member. This ensures easy packing of the absorbent/adsorbent in the outer wall member. The heat treatment under water cooling effectively enhances the strength of the outer wall member. The heat treatment is carried out after the narrowing of the opening of the outer wall member. This arrangement prevents the effects of the heat treatment from being damaged by the opening narrowing process.

In one preferable embodiment of the manufacturing method of the first application, the gas storage tank stores hydrogen, the absorbent/adsorbent includes at least a hydrogen storage alloy, and the outer wall member is composed of an aluminum-containing metal.

Aluminum has excellent thermal conductance and is light in weight. A container of aluminum (aluminum alloy) is capable of storing high-pressure hydrogen without any leakage. Namely aluminum is a favorable material of the outer wall member included in a hydrogen storage tank. The outer wall member composed of the aluminum-containing metal goes through heat treatment under water cooling, which enhances the fatigue strength of the outer wall member.

In this preferable embodiment of the manufacturing method of the first application, the filling unit may include a fin structure, which comes into contact with the absorbent/adsorbent.

This structure desirably enhances the thermal conductance in the filling unit and efficiently releases the heat, which is produced by the absorbent/adsorbent in the process of absorption or adsorption of the gas, so as to accelerate absorption or adsorption of the gas into the adsorbent/absorbent.

In one preferable structure of this embodiment, the filling unit includes the fin structure, which is formed by laminating multiple thin plate members having through holes, and the absorbent/adsorbent is packed into cavities, which are formed between the multiple thin plate members in the filling unit and are mutually connected via the through holes formed in the multiple thin plate members.

The lamination of multiple thin plate members effectively enhances the thermal conductance in the filling unit and desirably facilitates setting of the fin structure in the filling unit. The absorbent/adsorbent is packed into the cavities of the filling unit via the through holes formed in the thin plate members. The filling unit of this rather complicated structure ensures easy packing of the absorbing/adsorbent, since the absorbent/adsorbent is packed into the filling unit prior to the placement of the filling unit into the outer wall member.

In another preferable embodiment of the manufacturing method of the first application, the filling unit includes a coolant channel, through which a coolant flows. The manufacturing method further has the step of: connecting the coolant channel with the outside of the outer wall member via the narrowed opening to supply and discharge the coolant to and from the coolant channel.

The coolant channel located in the filling unit facilitates cooling and heating of the absorbent/adsorbent and thus enhances the efficiencies of gas absorption or adsorption and gas release. The filling unit of this rather complicated structure ensures easy packing of the absorbing/adsorbent, since the absorbent/adsorbent is packed into the filling unit prior to the placement of the filling unit into the outer wall member.

The first application of the invention is not narrowed to the manufacturing method of the gas storage tank discussed above but is actualized in any of other diverse forms, for example, a gas storage tank manufactured by the manufacturing method of the gas storage tank.

A second application of the invention is directed to a gas storage tank for storing a gas. The gas storage tank of the second application includes: a tank having an opening formed on at least one of two ends thereof; a filling unit that is housed in the tank; and a support member that is arranged between the tank and the filling unit and holds the filling unit in the tank to connect a whole gap formed between the tank and the filling unit with the opening.

In the gas storage tank of this structure, the whole gap formed between the tank and the filling unit is connected to at least one opening formed in the tank. This arrangement ensures easy circulation of the water flow through the tank and enables the tank to be abruptly cooled down with water in the process of heat treatment. The heat treatment under water cooling effectively enhances the strength of the tank in the gas storage tank.

In the gas storage tank of the second application, the filling unit may be filled with an absorbent/adsorbent for absorbing and/or adsorbing the gas. This structure effectuates heat treatment under water cooling to enhance the strength of the tank in the process of manufacturing the gas storage tank, which includes the filling unit filled with the absorbent/adsorbent.

A third application of the invention is directed to a gas storage tank for storing a gas. The gas storage tank of the third application includes: a filling unit that is filled with an absorbent/adsorbent for absorbing and/or adsorbing the gas; a tank that has two ends aligned along a longitudinal axis thereof and an opening formed on at least one of the two ends and houses the filling unit inside thereof; and a support member that is formed by multiple thin wavelike shaped plates arranged substantially in parallel with the longitudinal axis of the tank and has two open ends aligned along a longitudinal axis of the support member. The outside of the support member comes into contact with the tank, and the inside the support member comes into contact with the filling unit. The support member forms a gap between the tank and the filling unit to connect with the opening, while holding the filling unit in the tank.

In the gas storage tank of the third application, the multiple thin plates arranged substantially in parallel with the longitudinal axis of the tank form the cavities. The flow of water led through the opening of the tank formed on at least one end of the tank quickly enters these cavities. This arrangement enables the tank to be abruptly cooled down with water in the process of heat treatment. The heat treatment under water cooling effectively enhances the strength of the tank in the gas storage tank. The multiple thin plates may be individually separate elements or an integral element to attain the above arrangement. One example of the latter structure is one thin corrugated plate.

In the gas storage tank of the second application or the third application, the tank may have a narrowed element of a smaller cross sectional area at the opening formed on at least one of the two ends.

The narrowed element formed by narrowing the opening of the tank functions to keep the sufficient airtightness of the tank against the inner gas pressure. The tank goes through heat treatment under water cooling, after the insertion of the filling unit into the tank and the narrowing of the opening of the tank. The presence of the support member prevents the filling unit from interfering with the smooth flow of water and thus ensures efficient water cooling.

In the gas storage tank of the second application or the third application, the tank may have two openings on the two ends to face each other.

This structure readily makes circulation of water, which is led through one opening into the tank and is discharged from the other opening, thus effectuating abrupt water cooling in the process of heat treatment.

In the gas storage tank of the second application or the third application, the tank has a quasi-cylindrical shape, and the support member is formed by a thin wavelike shaped plate arranged substantially in parallel with a longitudinal axis of the quasi-cylindrical shape.

The tank of this shape gives the gas storage tank that is suitable for storage of a high-pressure gas. The support member formed by the thin plate arranged substantially in parallel with the longitudinal axis of the quasi-cylindrical shape reduces the total area of the support member on the cross section of the gas storage tank and ensures a sufficiently wide water channel for water cooling.

In one preferable embodiment of the gas storage tank of the second application or the third application, the gas storage tank stores hydrogen, the absorbent/adsorbent includes at least a hydrogen storage alloy, and the tank is composed of an aluminum-containing metal.

Aluminum has excellent thermal conductance and is light in weight. A container of aluminum (aluminum alloy) is capable of storing high-pressure hydrogen without any leakage. Namely aluminum is a favorable material of the tank included in a hydrogen storage tank. The tank composed of the aluminum-containing metal goes through heat treatment under water cooling, which enhances the fatigue strength of the tank.

In the gas storage tank of the second application or the third application, the support member may be made of a metal.

The metal support member improves the thermal conductance between the filling unit and the tank. Heat produced by hydrogen storage alloy in the process of absorption or adsorption of hydrogen is transmitted from the filling unit to the tank to be absorbed by the tank or another member or to be released outside. The efficient absorption or release of heat produced by the hydrogen storage alloy in the process of absorption or adsorption of hydrogen desirably increases the amount of hydrogen stored in the gas storage tank and accelerates the storage of hydrogen in the gas storage tank. This arrangement also desirably reduces the size of a coolant channel formed in the filling unit for discharge of heat or allows for even elimination of the coolant channel.

The second application or the third application of the invention is not narrowed to the gas storage tank discussed above but is actualized in any of other diverse forms, for example, a manufacturing method of such a gas storage tank.

The invention is accordingly directed to a method of manufacturing a gas storage tank for storing a gas. This manufacturing method includes the steps of: inserting a filling unit into a tank having at least one opening; arranging a support member between the filling unit and the tank to connect a whole gap formed between the tank and the filling unit with the opening; and heat-treating the tank under water cooling, after the placement of the filling unit and the arrangement of the support member.

These and other objects, features, aspects, and advantages of the present invention will become more apparent from the following detailed description of the preferred embodiments with the accompanying drawings.

DETAILED DESCRIPTION OF THE PREFERRED EMBODIMENTS

The hydrogen storage tank and the method of manufacturing the hydrogen storage tank of the invention are discussed below as preferred embodiments with reference to the accompanied drawings. Some details of the embodiments are described below for the better understanding, but the invention is not required to include all the constituents described in detail.

First Embodiment

Structure of Hydrogen Storage Tank 10

Figure 1:
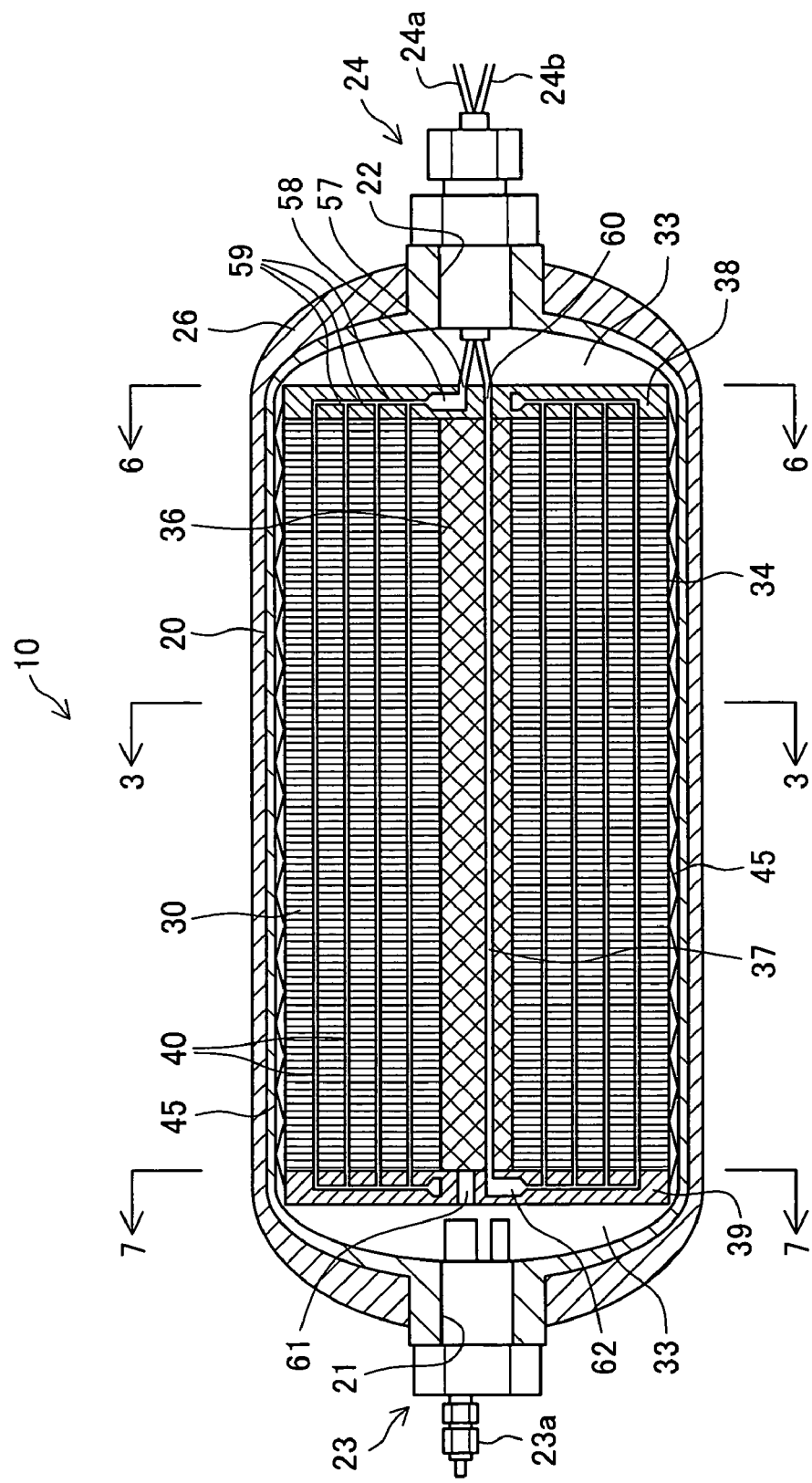
FIG. 1 is a vertical sectional view schematically illustrating the internal structure of a hydrogen storage tank in a first embodiment of the invention.

FIG. 1 is a vertical sectional view schematically illustrating the internal structure of a hydrogen storage tank 10 in a first embodiment of the invention. The hydrogen storage tank 10 includes a tank container 20 and a heat exchanger unit 30 located inside the tank container 20.

The tank container 20 functions as an outer wall member of the hydrogen storage tank 10 and is defined by a quasi-cylindrical hollow vessel. In the structure of this embodiment, the tank container 20 is made of an aluminum alloy. The tank container 20 has joint openings 21 and 22 on both ends thereof, which have smaller virtually-circular cross sections than the center cross section of the tank container 20. Joint assemblies 23 and 24 are set in the respective joint openings 21 and 22. The joint assemblies 23 and 24 form the structure of keeping the sufficient airtightness of the tank container 20 at the joint openings 21 and 22 to prevent leakage of hydrogen stored in the tank container 20. The joint assembly 23 has a hydrogen supply/discharge opening 23a, which is open to the outside to supply and discharge a flow of gaseous hydrogen into and from the tank container 20. The joint assembly 24 has a coolant supply opening 24a and a coolant discharge opening 24b, which are open to the outside to supply a selected coolant into the tank container 20 and to discharge the coolant from the tank container 20. The outer circumference of the tank container 20 is covered with a reinforcement layer 26. The reinforcement layer 26 is made of carbon fiber reinforced plastic (CFRP) and enhances the strength of the tank container 20, which stores high-pressure hydrogen therein.

The heat exchanger unit 30 has a heat exchanger casing 34, which is a quasi-cylindrical vessel having a smaller cross section than the cross section of the tank container 20. The heat exchanger casing 34 is filled with hydrogen storage alloy. Thin plate members of an aluminum alloy are laid one upon another in the heat exchanger casing 34, and the hydrogen storage alloy is packed in the laminate of thin plate members, as described later in detail. Multiple coolant channels 40 are formed to pass through the longitudinal axis of the heat exchanger unit 30 and allow for heat exchange between the hydrogen storage alloy packed therein with a selected coolant. The multiple coolant channels 40 are connected to the coolant supply opening 24a included in the joint assembly 24. A flow conduit of the coolant connecting with the coolant supply opening 24a is extended in the tank container 20 and is branched off to the multiple coolant channels 40 at the end of the joint opening 22 of the heat exchanger unit 30. The flow of coolant is thus led through the multiple coolant channels 40.

The heat exchanger unit 30 also includes a quasi-cylindrical filter 36, which passes through the longitudinal axis on the approximate center of the heat exchanger unit 30. The filter 36 is a porous body of a sintered metal and carries the particles of the hydrogen storage alloy packed in the heat exchanger unit 30 with substantially prohibiting their invasion. A coolant conduit 37 defining a coolant channel is located inside the filter 36 to pass through the laminating direction of the thin plate members in the heat exchanger unit 30. The multiple coolant channels 40 join together at the end of the joint opening 21 of the heat exchanger unit 30 and are connected to this coolant conduit 37. The coolant conduit 37 is extended to the joint opening 22 and is open to the coolant discharge opening 24b included in the joint assembly 24. The flows of the coolant running through the multiple coolant channels 40 are joined together at the end of the joint opening 21 and are led in a reverse direction to go through the coolant conduit 37 and the coolant discharge opening 24b to be discharged to the outside.

A hydrogen filling space 33 is formed between the inner wall face of the tank container 20 and the heat exchanger unit 30. A supply of hydrogen fed into the hydrogen storage tank 10 is absorbed by and stored in the hydrogen storage alloy packed in the heat exchanger unit 30, while being stored as compressed hydrogen in gaps formed by the particles of the hydrogen storage alloy and in this hydrogen filling space 33.

A support member 45 is interposed between the tank container 20 and the heat exchanger unit 30. The support member 45 is a metal thin plate of, for example, an aluminum alloy, stainless steel, or a clad material of an aluminum alloy or stainless steel, corrugated at preset intervals. The support member 45 absorbs expansion and contraction in the heat exchanger unit 30 due to an increase or a decrease in temperature, while holding the heat exchanger unit 30 in the tank container 20. The support member 45 also allows for heat transmission between the heat exchanger unit 30 and the wall surface of the tank container 20. The support member 45 of the corrugated structure has elastic force to hold the heat exchanger unit 30. In a modified structure, the support member 45 may be attached to the tank container 20 and to the heat exchanger unit 30 to hold the heat exchanger unit 30.

Manufacturing Process of Hydrogen Storage Tank 10

Figure 2:
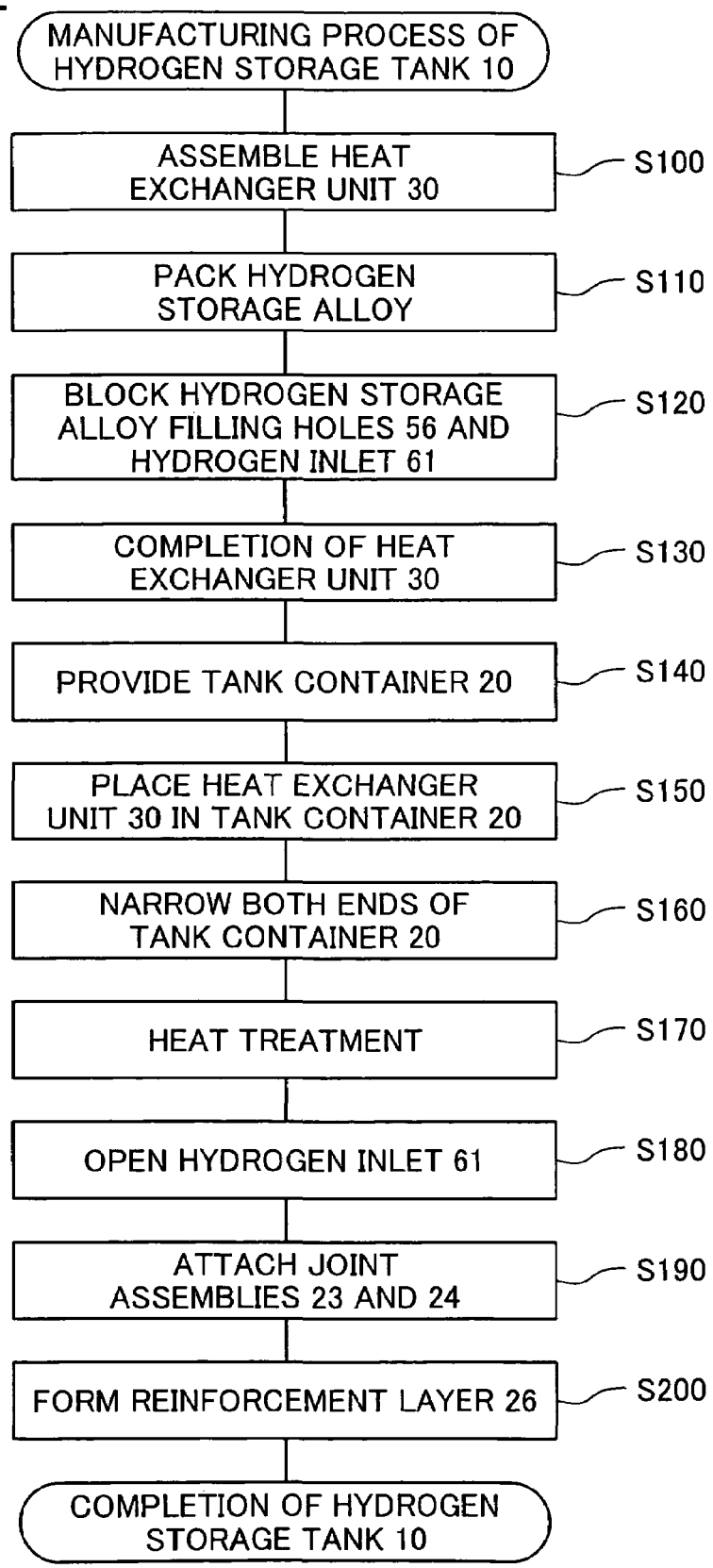
FIG. 2 is a flowchart showing a process of manufacturing the hydrogen storage tank in the first embodiment.

FIG. 2 is a flowchart showing a process of manufacturing the hydrogen storage tank 10 in the first embodiment. Steps S100 through S130 constitute a process of manufacturing the heat exchanger unit 30. The manufacturing process of the heat exchanger unit 30 first lays multiple thin plate members one upon another to assemble the heat exchanger unit 30 (step S100), as discussed below.

Figure 3:
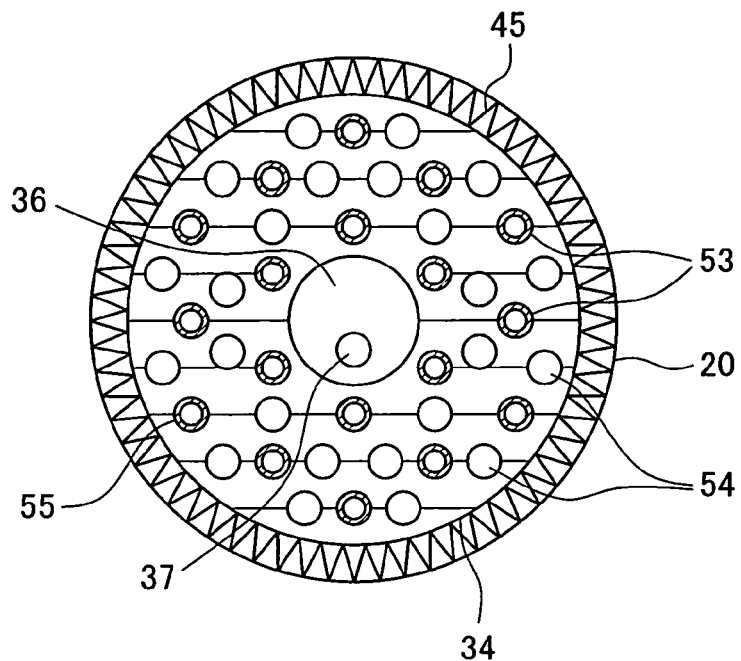
FIG. 3 is a sectional view taken on the line 3-3 in FIG. 1.
Figure 4:
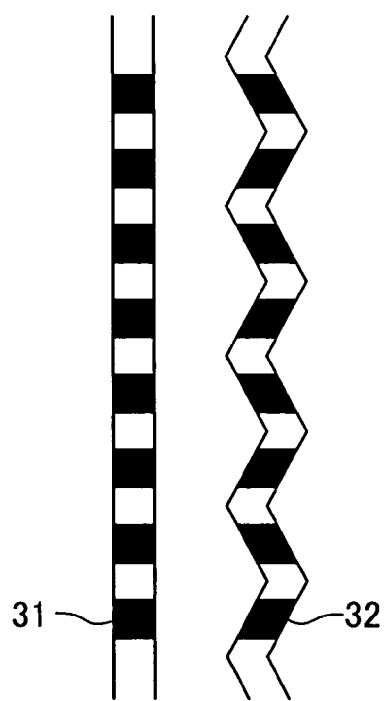
FIG. 4 shows the cross section of a flat plate and a corrugated plate.
Figure 5:
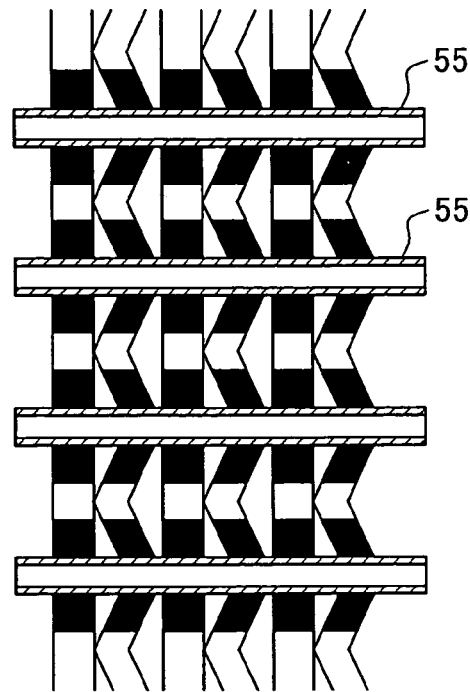
FIG. 5 is a vertical sectional view showing part of a heat exchanger.

The heat exchanger unit 30 is formed by alternately laminating two different types of disc-shaped thin plate members, flat plates 31 and corrugated plates 32, in the heat exchanger casing 34. FIG. 3 is a sectional view of the tank container 20 in the hydrogen storage tank 10, taken on the line 3-3 in FIG. 1. The hydrogen storage alloy actually packed in the heat exchanger unit 30 is omitted from the illustration of FIG. 3. FIG. 4 shows the cross section of the flat plate 31 and the corrugated plate 32 used to form the heat exchanger unit 30. FIG. 5 is a vertical sectional view showing part of the heat exchanger unit 30, in which the flat plates 31 and the corrugated plates 32 are alternately laminated. The flat plate 31 is a plain thin plate member, and the corrugated plate 32 is a thin plate member corrugated at preset intervals to have concaves and convexes. Only the thin plate members corresponding to the flat plates 31 are shown in FIG. 1. FIG. 3 shows the corrugated plate 32, where the corrugating positions are expressed by parallel lines. The flat plate 31 and the corrugated plate 32 as the two different types of disc-shaped thin plate members have multiple coolant apertures 53 and multiple hydrogen storage alloy filling apertures 54 at corresponding positions (see FIG. 3).

In the assembly of the heat exchanger unit 30, the multiple flat plates 31 and the multiple corrugated plates 32 are alternately laid one upon another, such that the coolant apertures 53 and the hydrogen storage alloy filling apertures 54 of the respective flat plates 31 and corrugated plates 32 are arrayed in an overlapping manner. Coolant pipes 55 are inserted into the respective arrays of the coolant apertures 53 arranged at the overlapping positions to pass through the heat exchanger unit 30 in the laminating direction (see FIGS. 3 and 5).

Each of the flat plates 31 and the corrugated plates 32 has a circular hole on its center. In the process of assembly of the heat exchanger unit 30, the filter 36 is inserted into an array of the circular holes aligned in the overlapping manner to pass through the heat exchanger unit 30 in the laminating direction (see FIGS. 1 and 3). The coolant conduit 37 is also inserted in the filter 36 to pass through the heat exchanger unit 30 in the laminating direction (see FIGS. 1 and 3).

Figure 6:
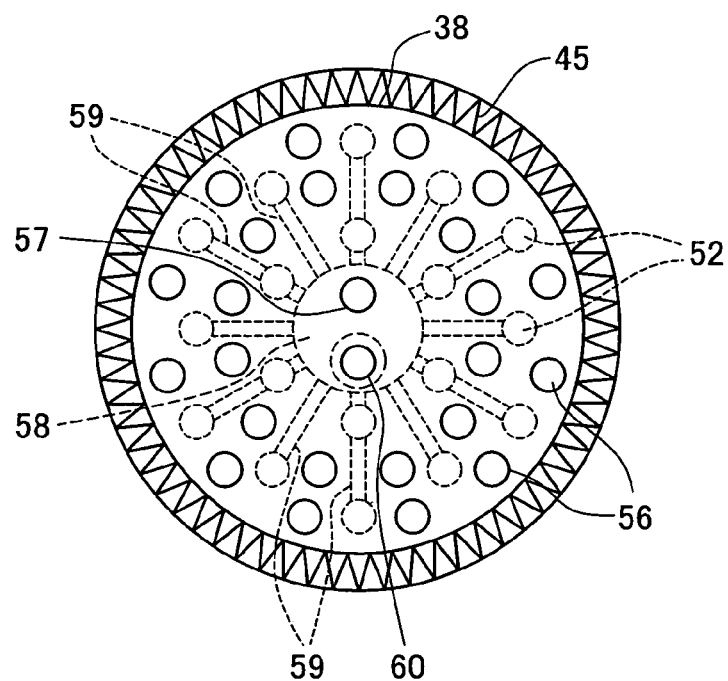
FIG. 6 is a sectional view taken on the line 6-6 in FIG. 1.
Figure 7:
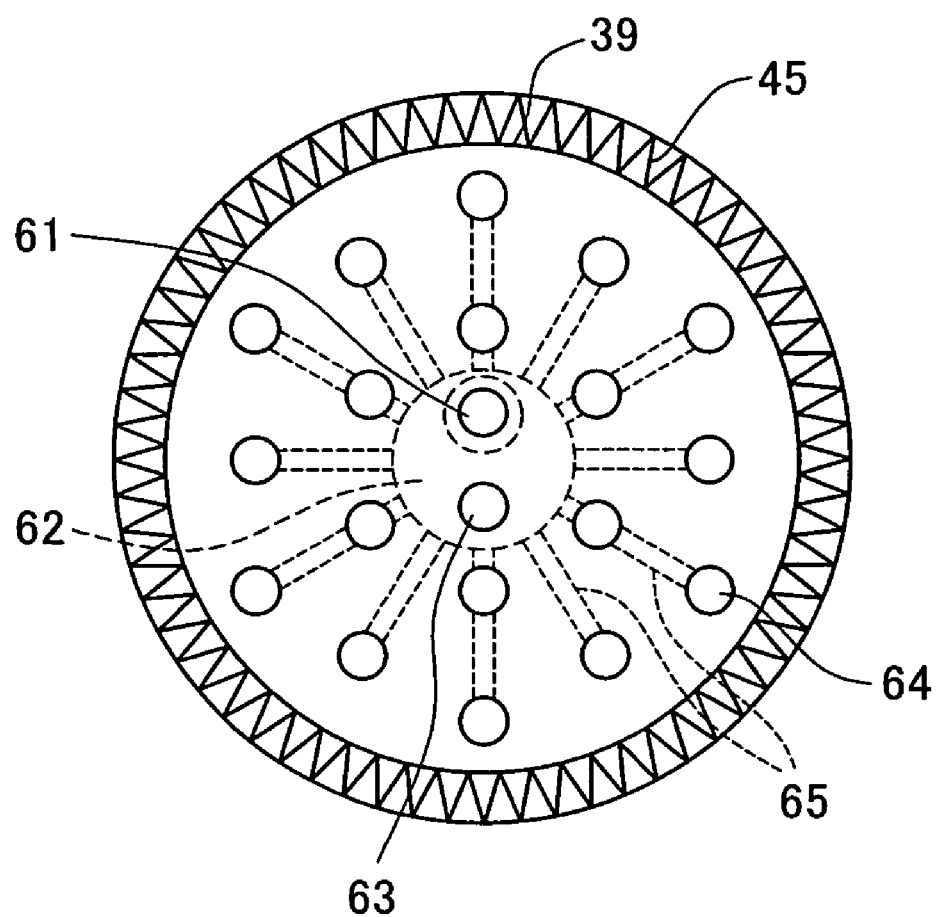
FIG. 7 is a sectional view taken on the line 7-7 in FIG. 1.

In the process of assembly of the heat exchanger unit 30, a first manifold plate 38 is located on one end of the laminate body of the flat plates 31 and the corrugated plates 32, whereas a second manifold plate 39 is located on the other end of the laminate body (see FIG. 1). FIG. 6 is a sectional view of the tank container 20 in the hydrogen storage tank 10, taken on the line 6-6 in FIG. 1. Namely the first manifold plate 38 is seen from the outer face of the laminate body in FIG. 6. FIG. 7 is a sectional view of the tank container 20 in the hydrogen storage tank 10, taken on the line 7-7 in FIG. 1. Namely the second manifold plate 39 is seen from the inner face of the laminate body in FIG. 7.

Referring to FIG. 6, the first manifold plate 38 has hydrogen storage alloy filling holes 56 at positions corresponding to the respective hydrogen storage alloy filling apertures 54 formed in the flat plates 31 and the corrugated plates 32. As shown by the broken lines, recesses 52 are formed on the opposite face to the surface explicitly shown in FIG. 6 at positions corresponding to the respective coolant apertures 53 formed in the flat plates 31 and the corrugated plates 32. The first manifold plate 38 also includes a specified distributing space 58 on its approximate center. The specified distributing space 58 is open as a cooling water inlet 57 (see FIG. 1) on the approximate center of the first manifold plate 38 on the surface explicitly shown in FIG. 6. The specified distributing space 58 in the first manifold plate 38 is connected with the respective recesses 52 via connection passages 59 formed in the first manifold plate 38. The first manifold plate 38 also has a cooling water outlet 60, which passes through its approximate center but is not connected with the distributing space 58. In the process of assembly of the heat exchanger unit 30, the first manifold plate 38 is attached to the laminate body of the flat plates 31 and the corrugated plates 32, such that the respective recesses 52 are connected with the corresponding coolant pipes 55 to form the coolant channels 40 and that the cooling water outlet 60 is connected with the coolant conduit 37. The hydrogen storage alloy filling holes 56 formed in the first manifold plate 38 are omitted from the illustration of FIG. 1, for the better understanding of the branching flows of the cooling water channel.

Referring to FIG. 7, the second manifold plate 39 has recesses 64 formed on the surface explicitly shown in FIG. 7 at positions corresponding to the respective coolant apertures 53 formed in the flat plates 31 and the corrugated plates 32. The second manifold plate 39 also includes a specified collecting space 62 formed on its approximate center. The specified collecting space 62 is open as a cooling water opening 63 on the approximate center of the second manifold plate 39 on the surface explicitly shown in FIG. 7. The specified collecting space 62 in the second manifold plate 39 is connected with the respective recesses 64 via connecting passages 65 formed in the second manifold plate 39. The second manifold plate 39 also has a hydrogen inlet 61, which passes through the approximate center thereof but is not connected with the collecting space 62. In the process of assembly of the heat exchanger unit 30, the second manifold plate 39 is attached to the laminate body of the flat plates 31 and the corrugated plates 32, such that the respective recesses 64 are connected with the corresponding coolant pipes 55 to form the coolant channels 40 and that the cooling water opening 63 is connected with the coolant conduit 37. The hydrogen inlet 61 is accordingly blocked by the end of the filter 36.

Referring back to the flowchart of FIG. 2, after assembly of the heat exchanger unit 30, the manufacturing process packs the particles of the hydrogen storage alloy into the heat exchanger unit 30 (step S110). The supply of the hydrogen storage alloy is flown through the hydrogen storage alloy filling holes 56 formed in the first manifold plate 38 and is led into the heat exchanger unit 30. The alternate arrangement of the flat plates 31 and the corrugated plates 32 in the heat exchanger unit 30 forms pores between the adjoining thin plate members in the laminate as shown in FIG. 5. The pores connect with one another via the hydrogen storage alloy filling apertures 54 formed in the flat plates 31 and the corrugated plates 32. The supply of the hydrogen storage alloy is flown through the hydrogen storage alloy filling holes 56 formed in the first manifold plate 38 and is led into the heat exchanger unit 30 via the hydrogen storage alloy filling apertures 54 formed in the flat plates 31 and the corrugated plates 32 to be packed in the pores.

After filling the heat exchanger unit 30 with the hydrogen storage alloy, the manufacturing process blocks the respective hydrogen storage alloy filling holes 56 formed in the first manifold plate 38 and the hydrogen inlet 61 of the second manifold plate 39 (step S120). The hydrogen storage alloy filling holes 56 are not required to reopen and are thus sealed by, for example, welding. The hydrogen inlet 61 is, however, required to reopen, prior to completion of the hydrogen storage tank 10 and is thus blocked in a re-openable manner. For example, a bolt having a specific size corresponding to the hydrogen inlet 61 is used as a cover member and is screwed into the hydrogen inlet 61 to block up the hydrogen inlet 61. The hydrogen inlet 61 is blocked here to prevent water from entering the heat exchanger unit 30 in a subsequent heat treatment process (discussed later). For example, an O ring may be used to ensure the required sealing properties.

Figure 8A:
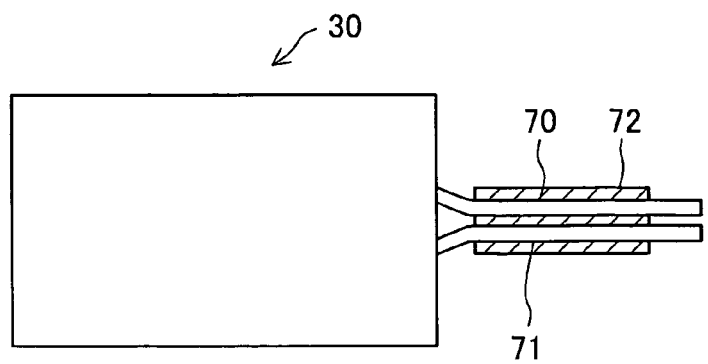
FIGS. 8(A)-(C) shows the manufacturing process of and after step S130 in the flowchart of FIG. 2.
Figure 8B:
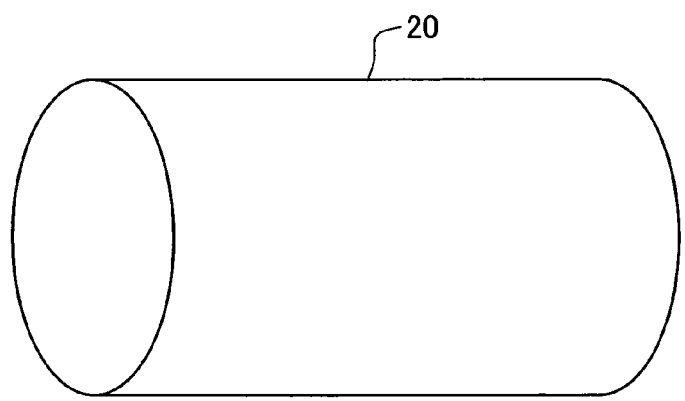

After blockage of the hydrogen storage alloy filling holes 56 and the hydrogen inlet 61, the manufacturing process connects coolant channels with the heat exchanger unit 31 to complete the heat exchanger unit 30 (step S130). FIGS. 8 and 9 schematically show the manufacturing process of and after step S130. FIG. 8(A) shows the heat exchanger unit 30 completed at step S130. The manufacturing process connects tubular members 70 and 71 made of, for example, stainless steel with the cooling water inlet 57 and the cooling water outlet 60 of the first manifold plate 38 and sets the tubular members 70 and 71 in a cylindrical member 72 made of, for example, stainless steel to complete the heat exchanger unit 30 at step S130. The cylindrical member 72 is shown in cross section in the illustration of FIG. 8(A). This clearly shows that the tubular members 70 and 71 pass through the cylindrical member 72.

On completion of the heat exchanger unit 30, the manufacturing process provides the tank container 20 (step S140). The tank container 20 of this embodiment is composed of an aluminum alloy and is provided at step S140 as a tube with both ends open as shown FIG. 8(B).

Figure 8C:
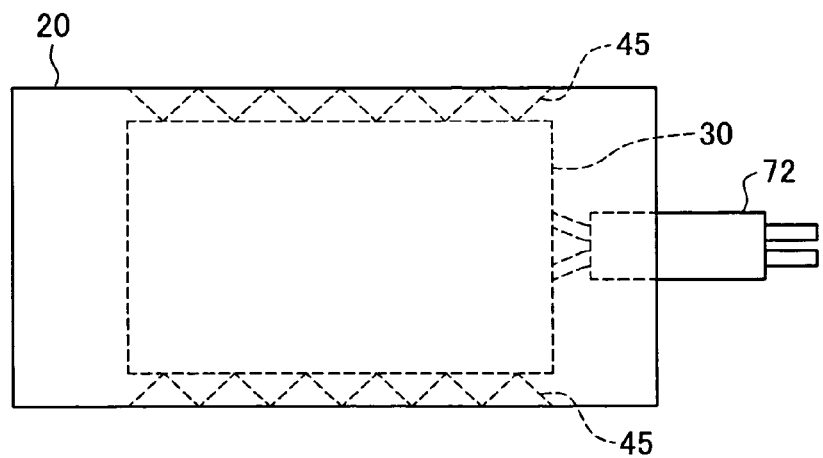
Figure 9:
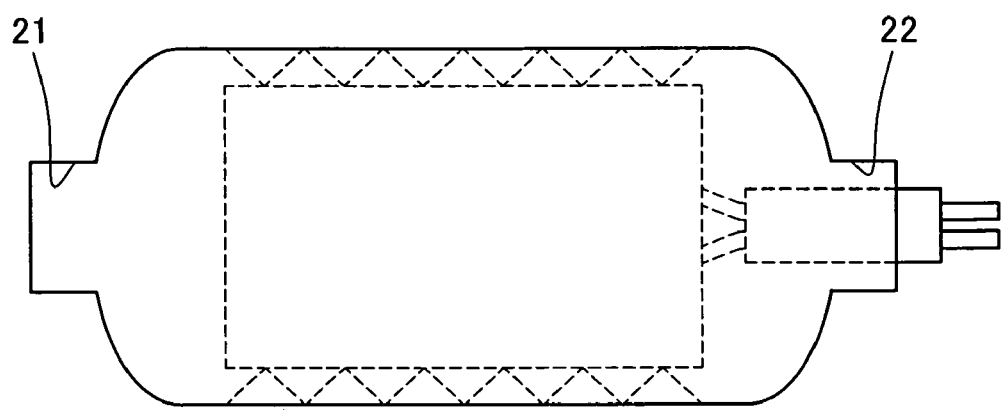
FIG. 9 shows the manufacturing process after step S160 in the flowchart of FIG. 2.

The manufacturing process locates the heat exchanger unit 30 completed at step S130 in the tank container 20 provided at step S140 (step S150, see FIG. 8(C)). The support member 45 is interposed between the tank container 20 and the heat exchanger unit 30, when the heat exchanger unit 30 is set in the tank container 20 at step S140.

The manufacturing process subsequently narrows both ends of the tank container 20 (step S160), so as to narrow the openings at both ends of the tank container 20 and form the joint openings 21 and 22 (see FIG. 9).

The tank container 20 then goes through heat treatment (step S170). The heat treatment is performed to improve the fatigue strength of the aluminum alloy of the tank container 20. In the hydrogen storage tank 10, the respective constituents are expanded and compressed with a variation in temperature, and the internal pressure varies with storage and release of hydrogen. The expansion and compression of the constituents and the variation in internal pressure cause distortion in the shape of the tank container 20 at a certain rate. The repeated distortion gradually accumulates the metal fatigue on the aluminum alloy of the tank container 20. The heat treatment enhances the resistance to such metal fatigue. The procedure of this embodiment applies a known T6 treatment for the aluminum alloy to the heat treatment. The heat treatment heats up the aluminum alloy to the state of a solid solution in a temperature range of 515 to 550° C. and then abruptly cools down the heated aluminum alloy with water. The flow of water is led into the tank container 20 to ensure abrupt cooling of the aluminum alloy with water.

After the heat treatment, the manufacturing process removes the cover member from the hydrogen inlet 61 of the second manifold plate 39 to reopen the hydrogen inlet 61 (step S180). Namely the cover member set in the hydrogen inlet 61 is detached via the joint opening 21 formed at step S160.

The manufacturing process then attaches the joint assembly 23 to the joint opening 21 and the joint assembly 24 to the joint opening 22, respectively (step S190). In the structure of this embodiment, the joint assembly 23 has a solenoid-operated on-off valve and a pressure reducing valve. The flow of high-pressure gaseous hydrogen is introduced via the hydrogen supply/discharge opening 23a to be stored in the hydrogen storage tank 10. The flow of low-pressure gaseous hydrogen reduced by means of the pressure reducing valve is discharged from the hydrogen storage tank 10 to the outside via the hydrogen supply/discharge opening 23a. The cylindrical member 72 is arranged to pass through the joint assembly 24. The cylindrical member 72 has the penetrating tubular members 70 and 71 as discussed above. In this arrangement of the cylindrical member 72, the ends of the tubular members 70 and 71 respectively form the coolant supply opening 24a and the coolant discharge opening 24b.

The manufacturing process subsequently forms the reinforcement layer 26 on the outer circumference of the tank container 20 (step S200) and completes the hydrogen storage tank 10. The reinforcement layer 26 is formed, for example, by winding carbon fibers soaked in an epoxy resin about the outer circumference of the tank container 20 and curing the soaking epoxy resin.

Storage and Release of Hydrogen into and from Hydrogen Storage Tank in First Embodiment A supply of high-pressure hydrogen is introduced into the hydrogen storage tank 10 via the hydrogen supply/discharge opening 23a for storage of hydrogen in the hydrogen storage tank 10. The flow of hydrogen led through the hydrogen supply/discharge opening 23a is flown through the solenoid valve of the joint assembly 23 and is led into the hydrogen filling space 33 in the hydrogen storage tank 10. The flow of hydrogen is further led into the heat exchanger unit 30 via the hydrogen inlet 61 and the filter 36, so as to be absorbed by and stored in the hydrogen storage alloy. The amount of hydrogen absorbed by and stored in the hydrogen storage alloy depends upon the pressure of hydrogen, the temperature, and the type of the hydrogen storage alloy. When the flow of hydrogen is supplied at a preset pressure, the hydrogen storage alloy is heated up to a specific temperature, while absorbing the hydrogen.

In the process of hydrogen storage, the coolant is flown into the hydrogen storage tank 10 via the coolant supply opening 24a, passes through the hydrogen storage tank 10, and is discharged to the outside via the coolant discharge opening 24b. The supply of the coolant introduced into the hydrogen storage tank 10 is branched off in the first manifold plate 38 to the respective coolant channels 40 and is joined together in the second manifold plate 39 to be discharged to the outside via the coolant conduit 37. Such circulation of the coolant cools down the inside of the hydrogen storage tank 10 and thereby accelerates absorption of hydrogen into the hydrogen storage alloy.

After the hydrogen storage alloy is heated up to the specific temperature, the hydrogen filling space 33 is filled with gaseous hydrogen at a pressure corresponding to the hydrogen supply pressure into the hydrogen storage tank 10. The hydrogen storage tank 10 is thus fully filled with hydrogen.

The flow of hydrogen reduced to a preset pressure is released from the hydrogen storage tank 10 via the hydrogen supply/discharge opening 23a. The compressed hydrogen is first released from the hydrogen filling space 33. With a decrease in pressure, the hydrogen absorbed by and stored in the hydrogen storage alloy is released. The hydrogen storage alloy absorbs heat with release of hydrogen. The flow of hot coolant having a predetermined temperature is flown through the coolant channels to heat up the hydrogen storage alloy and enable continuous release of hydrogen from the hydrogen storage alloy.

In the process of absorbing hydrogen in the hydrogen storage alloy or releasing hydrogen from the hydrogen storage alloy, the respective thin plate members laminated in the heat exchanger unit 30 function as fins for accelerating heat exchange between the hydrogen storage alloy and the coolant. In the hydrogen absorbing process, the heat produced by the hydrogen storage alloy is transmitted to the coolant in the coolant channels 40 via the fins to accelerate the storage of hydrogen. In the hydrogen releasing process, on the other hand, the heat of the coolant in the coolant channels 40 is transmitted to the hydrogen storage alloy via the fins to accelerate the release of hydrogen. In the process of absorbing hydrogen in the hydrogen storage alloy, the heat produced by the hydrogen storage alloy with storage of hydrogen is transferred to the tank container 20 via the thin plate members functioning as fins, the heat exchanger casing 34, and the support member 45 and is released out of the tank container 20.

As described above, the manufacturing process of the hydrogen storage tank 10 in the first embodiment fills the heat exchanger unit 30 with the particles of the hydrogen storage alloy, and attaches the detachable cover member to the heat exchanger unit 30 to block the space filled with the hydrogen storage alloy. The manufacturing process locates the heat exchanger unit 30 in the tank container 20, narrows the ends of the tank container 20, performs heat treatment accompanied with abrupt water cooling, and removes the cover member. This arrangement effectively prevents the hydrogen storage alloy packed in the heat exchanger unit 30 from being wet in the water cooling step of the heat treatment. It is extremely difficult to dry up the wet particles of the hydrogen storage alloy after packing in the heat exchanger unit 30. Once being wet, the hydrogen storage alloy may lower its hydrogen absorbing capacity. Attachment of the detachable cover member to the heat exchanger unit 30 effectively prevents such potential problems of the hydrogen storage alloy. After the heat treatment, the cover member is removed from the heat exchanger unit 30 to reopen the hydrogen inlet 61. This forms the opening on the surface of the heat exchanger unit 30, through which the flow of hydrogen is introduced for storage in the hydrogen storage alloy or is released from the hydrogen storage alloy.

As described above, heat treatment enhances the fatigue strength of the aluminum alloy and allows the higher-pressure hydrogen, for example, hydrogen having a pressure of or over 1 MPa, to be stored in the hydrogen filling space 33 in the hydrogen storage tank 10. The presence of the reinforcement layer 26 allows for storage of the higher-pressure hydrogen, for example, hydrogen having a pressure of or over 25 MPa or even 35 MPa. The aluminum alloy is favorably used as the material of the tank container 20, since it has excellent thermal conductance, is light in weight, and effectively prevents leakage of even such high-pressure hydrogen.

Restriction of the openings formed in the tank container 20 is required to keep the sufficient airtightness of the tank container 20 and to give the sufficient resistance to the high pressure of the hydrogen stored therein. The opening of the tank container 20 is, on the other hand, required to have a sufficiently large size to allow placement of the heat exchanger unit 30. The procedure of this embodiment accordingly narrows the ends of the tank container 20 by the narrowing process after placement of the heat exchanger unit 30 into the tank container 20. When the heat treatment process with abrupt water cooling is carried out prior to the narrowing process, the effects of heat treatment on improvement in fatigue resistance may be damaged by the narrowing process. The heat treatment process with abrupt water cooling is thus to be performed after the narrowing process. The heat treatment is desirably carried out after the placement of the heat exchanger unit 30 into the tank container 20 and the narrowing process. It is, however, extremely difficult to fill the heat exchanger unit 30 with the particles of the hydrogen storage alloy via the small openings (the joint openings 21 and 22 narrowed by the narrowing process. The manufacturing process of the hydrogen storage tank 10 in the first embodiment includes the respective steps in the adequate order to readily fill the heat exchanger unit 30 with the particles of the hydrogen storage alloy, while effectively preventing the hydrogen storage alloy from being wet.

The hydrogen inlet 61 with the detachable cover member is positioned to ensure easy detachment of the cover member through the opening (joint opening 21) narrowed by the narrowing process. For example, the hydrogen inlet 61 is located on the approximate center of the disc-shaped second manifold plate 39.

Second Embodiment

Structure of Hydrogen Storage Tank 110

Figure 10:
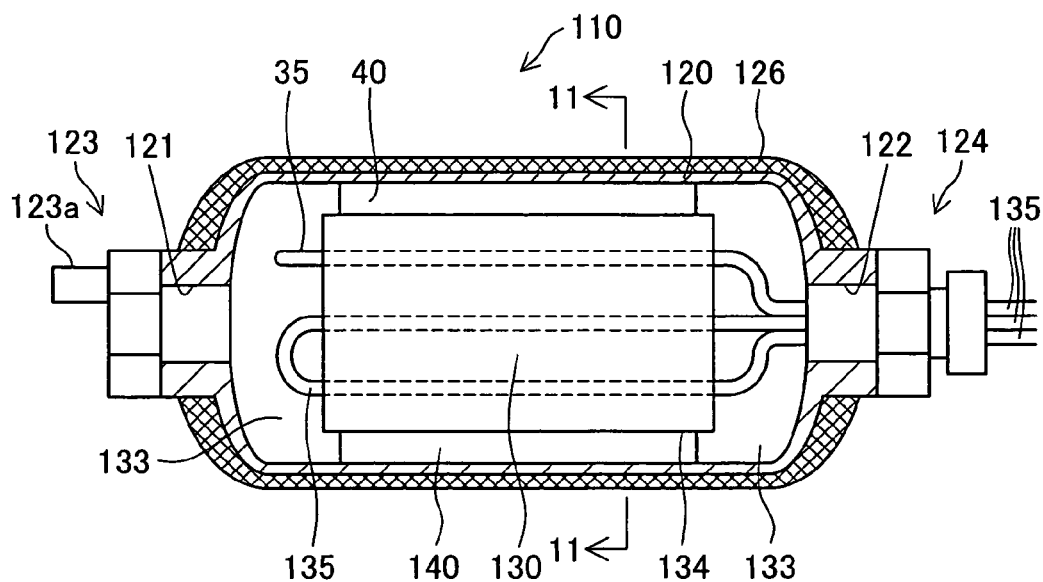
FIG. 10 schematically illustrates the structure of a hydrogen storage tank in a second embodiment of the invention.
Figure 11:
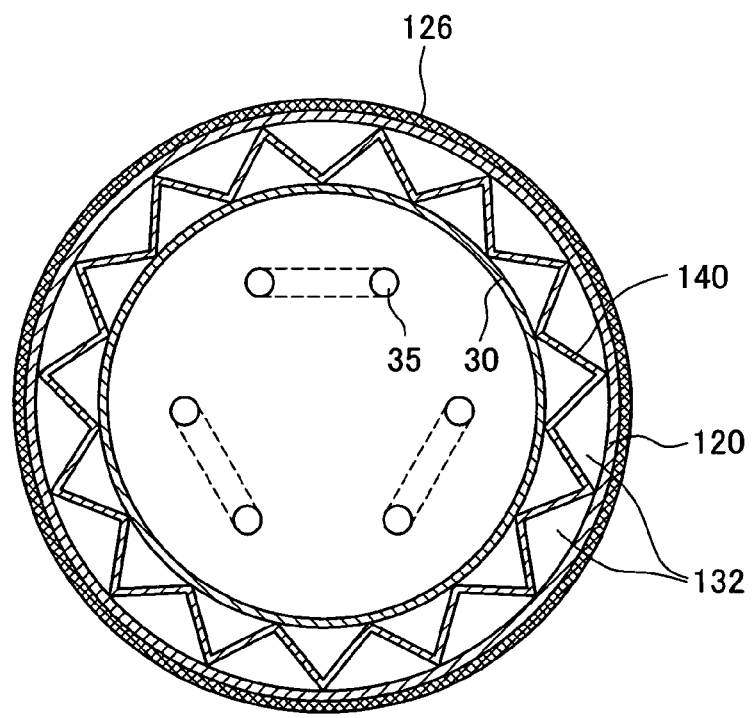
FIG. 11 is a sectional view taken on the line 11-11 in FIG. 10.

FIG. 10 schematically illustrates the structure of a hydrogen storage tank 110 in a second embodiment of the invention. FIG. 11 is a sectional view of the hydrogen storage tank 110, taken on the line 11-11 in FIG. 10. The hydrogen storage tank 110 includes a tank container 120, a heat exchanger unit 130 located in the tank container 120, and a support member 140 interposed between the tank container 120 and the heat exchanger unit 130.

The tank container 120 is a quasi-cylindrical hollow vessel and is made of an aluminum alloy in this embodiment. The tank container 120 has joint openings 121 and 122 on both ends thereof, which have smaller virtually-circular cross sections than the center cross section of the tank container 120.

Joint assemblies 123 and 124 are set in the respective joint openings 121 and 122. The joint assemblies 123 and 124 form the structure of keeping the sufficient airtightness of the tank container 120 at the joint openings 121 and 22 to prevent leakage of gaseous hydrogen stored in the tank container 120. The joint assembly 123 has a hydrogen supply/discharge opening 123a, which is open to the outside to supply and discharge a flow of gaseous hydrogen into and from the tank container 120.

The heat exchanger unit 130 has a heat exchanger casing 134, which is a quasi-cylindrical vessel having a smaller cross section than the cross section of the tank container 120. The heat exchanger casing 134 is filled with hydrogen storage alloy. Three coolant channels 135 are formed to pass through the longitudinal axis of the heat exchanger unit 130 and allow for heat exchange between the hydrogen storage alloy packed in the heat exchanger unit 130 and a selected coolant. Each of the three coolant channels 135 is formed in a U shape. Each of the U-shaped coolant channels 135 has both ends extended out of the tank container 120 via the joint assembly 124 set in the joint opening 122. Each of the U-shaped coolant channels 135 has a U-shaped bend protruded from the heat exchanger casing 134 at the end of the joint opening 121. A flow of the coolant supplied to each of the U-shaped coolant channels 135 is introduced from one end of the coolant channel 135 extended out of the tank container 120 at the joint assembly 124 and is flown through the coolant channel 135 along the longitudinal axis of the heat exchanger unit 130. The flow of the coolant running through the coolant channel 135 is inverted at the U-shaped bend protruded from the heat exchanger casing 134, is led toward the joint assembly 124, and is discharged outside the hydrogen storage tank 110 via the other end of the coolant channel 135 extended out of the tank container 120 at the joint assembly 124.

The support member 140 is interposed between the tank container 120 and the heat exchanger unit 130 to surround the outer circumference of the heat exchanger unit 130. The support member 140 is a metal thin plate of, for example, an aluminum alloy, stainless steel, or a clad material of an aluminum alloy or stainless steel, corrugated at preset intervals. The support member 140 absorbs expansion and contraction in the heat exchanger unit 130 due to an increase or a decrease in temperature, while holding the heat exchanger unit 130 in the tank container 120. The support member 140 of the corrugated structure has elastic force to hold the heat exchanger unit 130. The support member 140 also allows for heat transmission between the heat exchanger unit 130 and the wall surface of the tank container 120. In a modified structure, the support member 140 may be attached to the tank container 120 and to the heat exchanger unit 130 to hold the heat exchanger unit 130 in the tank container 120 and to enhance the heat transmission.

The corrugated structure of the support member 140 forms multiple inner cavities 132 along the longitudinal axis of the tank container 120 between the inner wall surface of the tank container 120 and the heat exchanger unit 130 (see FIG. 11). End cavities 133, which are not via the support member 140, are formed on both ends of the longitudinal axis of the tank container 120 between the inner wall surface of the tank container 120 and the heat exchanger unit 140 (see FIG. 10). A supply of hydrogen fed into the hydrogen storage tank 110 is absorbed by and stored in the hydrogen storage alloy packed in the heat exchanger unit 130, while being stored as compressed hydrogen in gaps formed by the particles of the hydrogen storage alloy, in the inner cavities 132, and in the end cavities 133. As discussed later, the tank container 120 is subjected to heat treatment with abrupt water cooling in the process of manufacturing the hydrogen storage tank 110. The multiple inner cavities 132 form the water channels in the water cooling step.

The outer circumference of the tank container 120 is covered with a reinforcement layer 126. The reinforcement layer 126 is made of carbon fiber reinforced plastic (CFRP) and enhances the strength of the tank container 120, which stores high-pressure hydrogen therein.

Manufacturing Process of Hydrogen Storage Tank 110

Figure 12:
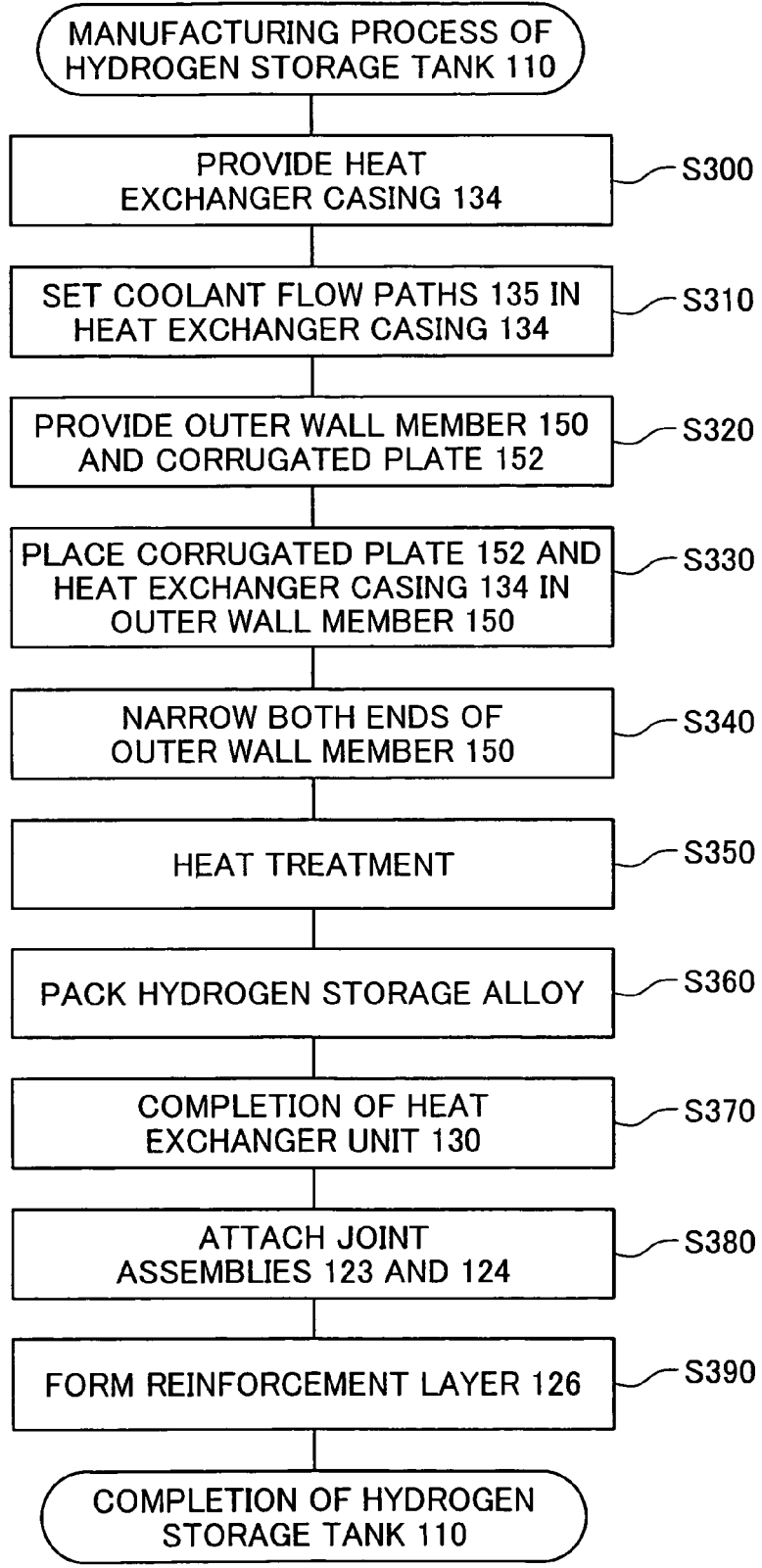
FIG. 12 is a flowchart showing a process of manufacturing the hydrogen storage tank in the second embodiment.

FIG. 12 is a flowchart showing a process of manufacturing the hydrogen storage tank 110 in the second embodiment. FIGS. 13(A)-(C) and 14(A)-(B) show main parts of the manufacturing process of the hydrogen storage tank 110 in the second embodiment.

Figure 13A:
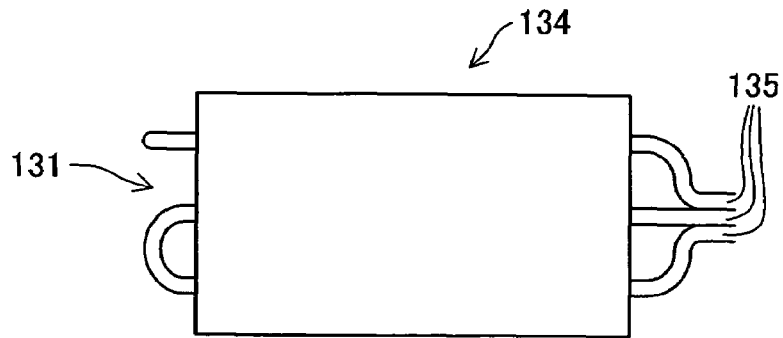
FIGS. 13(A)-(C) shows a main part of the manufacturing process of the hydrogen storage tank in the second embodiment.

The manufacturing process of the hydrogen storage tank 110 first provides the heat exchanger casing 134, which is a hollow cylindrical vessel (step S300) and sets the three coolant channels 135 in the heat exchanger casing 134 (step S310, see FIG. 13(A)). The setting process makes holes in the heat exchanger casing 134 for receiving the coolant channels 135 therein, inserts the respective two ends of the U-shaped coolant channels 135 from one end of the heat exchanger casing 134, and causes the U-shaped coolant channels 135 to pass through the heat exchanger casing 134 and to be protruded from the other end of the heat exchanger casing 134. The coolant channels 135 passing through the heat exchanger casing 134 are fixed to the heat exchanger casing 134 by welding, which fills in the clearances between the coolant channels 135 and the heat exchanger casing 134. The procedure of step S310 further bends the coolant channels 135 protruded from the other end of the heat exchanger casing 134 and bundles the six bent ends of the coolant channels 135 protruded from the other end along the center axis of the heat exchanger casing 134 (see FIG. 13(A)). A hole 131 for filling the hydrogen storage alloy is formed on the approximate center of the face of the heat exchanger casing 134 (the bottom of the cylindrical shape), from which the U-shaped bends of the U-shaped coolant channels 135 are extended. The position of the hole 131 is shown by the arrow in FIG. 13(A).

Figure 13B:
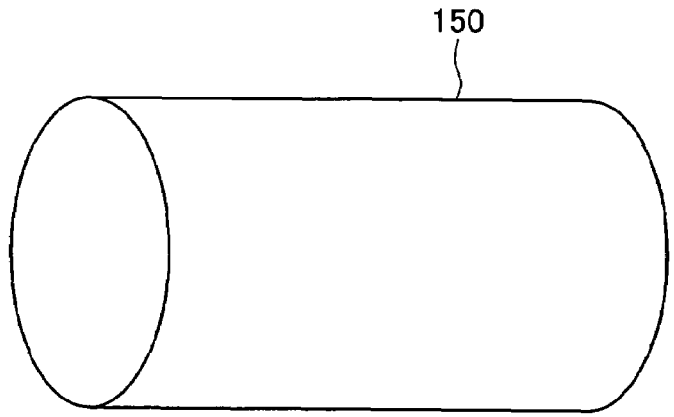
Figure 13C:
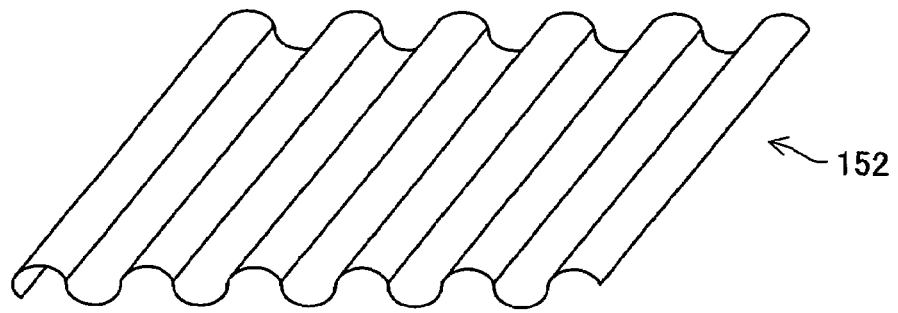

The manufacturing process subsequently provides a quasi-cylindrical outer wall member 150 with both ends open and a corrugated plate 152 to form the support member 140 (step S320). FIG. 13(B) shows the appearance of the outer wall member 150, and FIG. 13(C) shows the appearance of the corrugated plate 152. The manufacturing process inserts the corrugated plate 152 and the heat exchanger casing 134 with the coolant channels 135 in the outer wall member 150 (step S330). The corrugated plate 152 is arranged to form multiple cavities, which are substantially parallel to one another and connect both ends of the outer wall member 150 with each other, between the outer wall member 150 and the heat exchanger casing 134. This arrangement of the corrugated plate 152 between the heat exchanger casing 134 and the outer wall member 150 forms the support member 140 (see FIG. 14(A)).

Figure 14A:
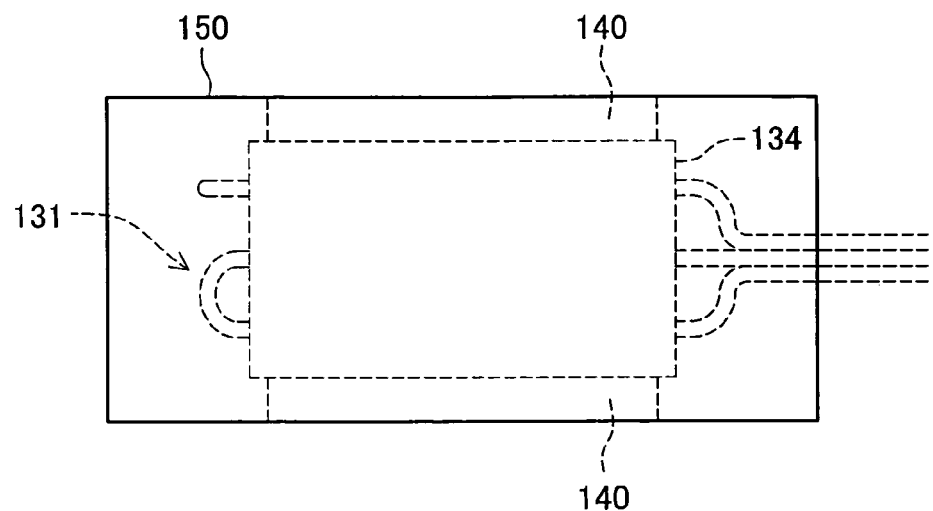
FIG. 14(A)-(B) shows another main part of the manufacturing process of the hydrogen storage ink in the second embodiment.
Figure 14B:
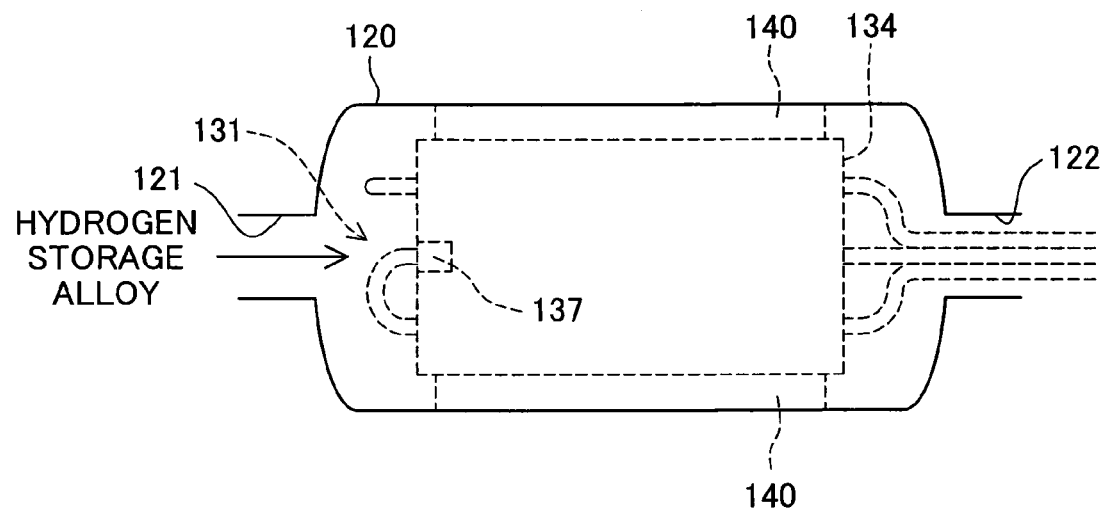

The manufacturing process then narrows both ends of the outer wall member 150, so as to narrow the openings at both the ends of the outer wall member 150 and form the narrow joint openings 121 and 122 (step S340). FIG. 14(B) shows the tank container 120 obtained by narrowing the openings of the outer wall member 150. The opening formed on the side, from which the respective ends of the coolant channels 135 are protruded, is the joint opening 122, and the opening on the opposite side is the joint opening 121.

The tank container 120 then goes through heat treatment (step S350). The heat treatment is performed to improve the fatigue strength of the aluminum alloy of the tank container 120. In the hydrogen storage tank 110, the respective constituents are expanded and compressed with a variation in temperature, and the internal pressure varies with storage and release of hydrogen. The expansion and compression of the constituents and the variation in internal pressure cause distortion in the shape of the tank container 120 at a certain rate. The repeated distortion gradually accumulates the metal fatigue on the aluminum alloy of the tank container 120. The heat treatment enhances the resistance to such metal fatigue. The procedure of this embodiment applies a known T6 treatment for aluminum alloy to the heat treatment. The heat treatment heats up the aluminum alloy to the state of a solid solution in a temperature range of 515 to 550° C. and then abruptly cools down the heated aluminum alloy with water. The flow of water is led into the tank container 120, that is, into the inner cavities 132 defined by the inner wall surface of the tank container 120 and the heat exchanger casing 134, to ensure abrupt cooling of the aluminum alloy with water.

After the heat treatment, the manufacturing process packs the particles of the hydrogen storage alloy into the heat exchanger casing 134 (step S360). The procedure of step S360 introduces the particles of the hydrogen storage alloy into the heat exchanger casing 134 through the hole 131 formed in the heat exchanger casing 134 via the joint opening 121 of the tank container 120 (see the arrow in FIG. 14(B)). The manufacturing process then seals the hole 131 and completes the heat exchanger unit 130 in the tank container 120 (step S370). The procedure of step S370 plugs a gas-permeable porous member 137 composed of a sintered metal into the hole 131, so as to close the hole 131 (see FIG. 14(B)). The porous member 137 carries the particles of the hydrogen storage alloy packed in the heat exchanger unit 130 with substantially prohibiting their invasion. This arrangement effectively prevents leakage of the hydrogen storage alloy packed in the heat exchanger unit 130. The hole 131 with the porous member 137 plugged therein works as the hydrogen channel when the supply of hydrogen is absorbed by and stored in the hydrogen storage alloy packed in the heat exchanger unit 130 of the hydrogen storage tank 110 and when the flow of hydrogen is released from the hydrogen storage alloy.

The manufacturing process then attaches the joint assembly 123 to the joint opening 121 and the joint assembly 124 to the joint opening 122, respectively (step S380). In the structure of this embodiment, the joint assembly 123 has a solenoid-operated on-off valve and a pressure reducing valve. The flow of high-pressure gaseous hydrogen is introduced via the hydrogen supply/discharge opening 123a to be stored in the hydrogen storage tank 110. The flow of low-pressure gaseous hydrogen reduced by means of the pressure reducing valve is discharged from the hydrogen storage tank 110 to the outside via the hydrogen supply/discharge opening 123a. The joint assembly 124 holds the respective ends of the three coolant channels 135, which are protruded from the tank container 120, while keeping the airtightness of the tank container 120.

The manufacturing process subsequently forms the reinforcement layer 126 on the outer circumference of the tank container 120 (step S390) and completes the hydrogen storage tank 110. The reinforcement layer 126 is formed, for example, by winding carbon fibers soaked in an epoxy resin about the outer circumference of the tank container 120 and curing the soaking epoxy resin.

Storage and Release of Hydrogen into and from Hydrogen Storage Tank in Second Embodiment A supply of high-pressure hydrogen is introduced into the hydrogen storage tank 110 via the hydrogen supply/discharge opening 123a for storage of hydrogen in the hydrogen storage tank 110. The flow of hydrogen led through the hydrogen supply/discharge opening 123a is led into the inner cavities 132 and the end cavities 133 formed in the hydrogen storage tank 110 and into the heat exchanger unit 130 via the porous member 137 plugged in the hole 131, so as to be absorbed by and stored in the hydrogen storage alloy. The amount of hydrogen absorbed by and stored in the hydrogen storage alloy depends upon the pressure of hydrogen, the temperature, and the type of the hydrogen storage alloy. When the flow of hydrogen is supplied at a preset pressure, the hydrogen storage alloy is heated up to a specific temperature, while absorbing the hydrogen. In the process of hydrogen storage, the coolant is circulated and flown through the three coolant channels 135 to cool down the inside of the hydrogen storage tank 110 and thereby accelerate absorption of hydrogen into the hydrogen storage alloy. After the hydrogen storage alloy is heated up to the specific temperature, the inner cavities 132 and the end cavities 133 are filled with gaseous hydrogen at a pressure corresponding to the hydrogen supply pressure into the hydrogen storage tank 110. The hydrogen storage tank 110 is thus fully filled with hydrogen.

The flow of hydrogen reduced to a preset pressure is released from the hydrogen storage tank 110 via the hydrogen supply/discharge opening 123a. The compressed hydrogen is first released from the inner cavities 132 and the end cavities 133. With a decrease in pressure, the hydrogen absorbed by and stored in the hydrogen storage alloy is released. The hydrogen storage alloy absorbs heat with release of hydrogen. The flow of hot coolant having a predetermined temperature is flown through the coolant channels to heat up the hydrogen storage alloy and enable continuous release of hydrogen from the hydrogen storage alloy.

In the process of absorbing hydrogen in the hydrogen storage alloy, part of the heat produced from the hydrogen storage alloy, due to storage of hydrogen, is transmitted to the tank container 120 via the heat exchanger casing 134 and the support member 140 and is released from the tank container 120.

As described above, in the hydrogen storage tank 110 of the second embodiment, the arrangement of the support member 140 forms the cavities between the tank container 120 and the heat exchanger unit 130 to connect the openings of the tank container 120, that is, the joint openings 121 and 122, with each other. This structure readily makes the water flow through the tank container 120 and thus ensures sufficiently abrupt cooling of the tank container 120 with water. In the structure of this embodiment, the support member 140 encircles the outer circumference of the heat exchanger unit 130 to connect the whole cavities formed between the tank container 120 and the heat exchanger unit 130 with both the joint openings 121 and 122. This enables the inside of the whole tank container 120 to be quickly cooled down with the flow of water.

As described above, heat treatment enhances the fatigue strength of the aluminum alloy and allows the higher-pressure hydrogen, for example, hydrogen having a pressure of or over 1 MPa, to be stored in the hydrogen storage tank 110 (in the inner cavities 132 and the end cavities 133). The presence of the reinforcement layer 126 allows for storage of the higher-pressure hydrogen, for example, hydrogen having a pressure of or over 25 MPa or even 35 MPa. Restriction of the openings formed in the tank container 120 is required to keep the sufficient airtightness of the tank container 120 and to give the sufficient resistance to the high pressure of the hydrogen stored therein. The opening of the tank container 120 is, on the other hand, required to have a sufficiently large size to allow placement of the heat exchanger unit 130. The procedure of this embodiment accordingly narrows the ends of the tank container 120 by the narrowing process after placement of the heat exchanger unit 130 into the tank container 120. When the heat treatment process with abrupt water cooling is carried out prior to the narrowing process, the effects of heat treatment on improvement in fatigue resistance may be damaged by the narrowing process. The heat treatment process with abrupt water cooling is thus to be performed after the narrowing process. The heat treatment with abrupt water cooling is desirably carried out after the placement of the heat exchanger unit 130 into the tank container 120 and the narrowing process. If the support structure for holding the heat exchanger unit in the tank container interferes with the smooth flow of water, the inside of the tank container may not be abruptly cooled down with water. In the structure of this embodiment, the support member 140 is arranged to form the cavities connecting with the openings on both ends of the tank container 120. These cavities ensure sufficiently abrupt water cooling.

MODIFIED EXAMPLE

In the embodiments discussed above, the tank container is made of the aluminum alloy. The aluminum alloy is, however, not the limited material, and the tank container may be composed of another suitable material, for example, stainless steel. The technique of the invention is also applicable to the process of manufacturing the tank container of another material, which includes heat treatment with abrupt water cooling, such as solution heat treatment.

The heat exchanger unit discussed in the above embodiments is not limited to the filling unit of the hydrogen storage alloy, but may be modified in various ways. One example is a filling unit including heat transmission means, such as fins. Metal fins located in the filling unit to come into contact with both the hydrogen storage alloy and the coolant channels enhance the cooling and heating efficiencies of the hydrogen storage alloy. The fins may otherwise be located in the filling unit to come into contact with both the hydrogen storage alloy and the tank container. This accelerates heat radiation in the process of storage of hydrogen. The coolant channels may be omitted from the structure, as long as the structure ensures sufficient cooling in the process of storage of hydrogen and sufficient heating in the process of release of hydrogen. The technique of the invention is preferably applied to any of these modified structure to ensure sufficiently abrupt water cooling, when the heat treatment with abrupt water cooling is carried out after placement of the filling unit (or the casing to form the filling unit) into the tank container.

In the embodiments discussed above, the heat exchanger unit functioning as the filling unit is filled with the hydrogen storage alloy. Another absorbent or adsorbent may be used, in addition to or instead of the hydrogen storage alloy. For example, active carbon or carbon nanotube may be used, in addition to the hydrogen storage alloy.

The tank container may include a filling unit without any absorbent or adsorbent, instead of the filling unit filled with the absorbent or adsorbent for absorbing and/or adsorbing hydrogen. The support member of the invention is favorably applied to any gas storage tank with a filling unit housed in a tank container to hold the filling unit in the tank container.

The above embodiments regard the hydrogen storage tank for storing hydrogen. The technique of the invention is generally applicable to a gas storage tank for storing a high-pressure gas.

Figure 15:
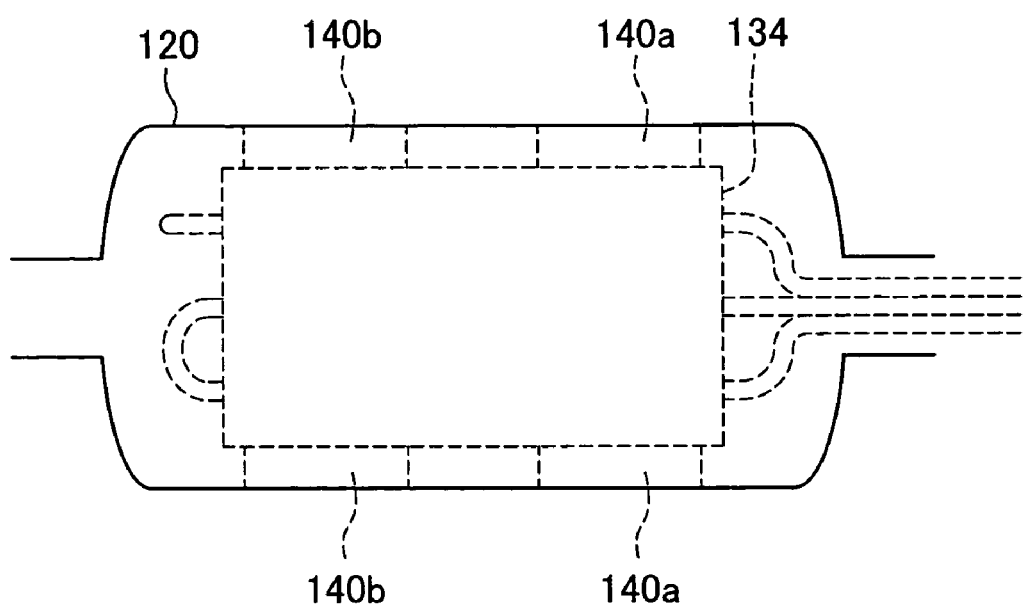
FIG. 15 schematically illustrates the structure of a hydrogen storage tank in a modified example of the second embodiment.

In the structure of the embodiment, the support member 140 is formed by the corrugated plate 152 having substantially the same length as the longitudinal dimension of the heat exchanger casing 134. In one modified structure, multiple short corrugated plates are arranged to encircle the outer circumference of the hydrogen storage tank and form the support member. A hydrogen storage tank of this modified structure is shown in FIG. 15. The modified structure of FIG. 15 includes two support members 140a and 140b, although the support member may be parted into a greater number of sections. The support member arranged to connect the cavities formed between the tank container and the heat exchanger unit with the opening of the tank container enables the water flow to be circulated in the whole tank container. This ensures abrupt cooling of the tank container with water. The arrangement of the support member to form the cavities substantially in parallel with the longitudinal axis of the tank container is especially desirable for the high water cooling efficiency.

In the structure of the second embodiment, the tank container 120 has the openings on both ends (the joint openings 121 and 122). This arrangement readily makes circulation of the water flow through the tank container 120 to attain abrupt cooling of the tank container 120 with water. The tank container is generally required to have at least one opening. As long as the support member is arranged to connect the whole gap formed between the tank container and the heat exchanger unit with the opening, the inside of the tank container is effectively cooled down with water in the process of heat treatment.

In the structure of the second embodiment, the support member 140 is the metal thin plate to ensure the sufficiently wide circulation space for the water flow between the tank container and the heat exchanger unit. A member other than the metal thin plate may be applied for the support member. As long as the support member is arranged to connect the whole gap formed between the tank container and the heat exchanger unit with the opening, the inside of the tank container is effectively cooled down with water in the process of heat treatment.

The manufacturing process of the second embodiment packs the particles of the hydrogen storage alloy into the tank container 120 through the hole 131 formed on one end of the tank container 120. This hole 131 also functions as the channel for storage and release of hydrogen. The hole used for packing of the hydrogen storage alloy may be different from the hole functioning as the channel for storage and release of hydrogen. In this modified structure, a porous member is plugged in the hole functioning as the channel for storage and release of hydrogen, prior to placement of the heat exchanger casing into the tank container. The hole used for packing of the hydrogen storage alloy is completely closed, for example, by welding after packing of the hydrogen storage alloy.

The manufacturing process of the second embodiment packs the particles of the hydrogen storage alloy into the heat exchanger casing 134, subsequent to narrowing of the openings of the tank container 120 with the heat exchanger casing 134 received therein and the heat treatment of the tank container 120. One modified procedure may pack the particles of the hydrogen storage alloy into the heat exchanger casing 134, prior to the placement of the heat exchanger casing 134 into the tank container 120. When the tank container 120 including the heat exchanger unit 130 filled with the particles of the hydrogen storage alloy goes through the heat treatment with abrupt water cooling, the heat exchanger unit 130 should have the sufficient sealing properties to prevent the hydrogen storage alloy from being wet by water cooling. For this purpose, one applicable structure uses a detachable cover member. The cover member is attached to the heat exchanger unit 130 after packing of the hydrogen storage alloy and is detached after the heat treatment with abrupt water cooling.

The embodiments discussed above regard the hydrogen storage tank and the method of manufacturing the hydrogen storage tank of the invention. These embodiments and their modified examples are to be considered in all aspects as illustrative and not restrictive. There may be many other modifications, changes, and alterations without departing from the scope or spirit of the main characteristics of the present invention. All changes within the meaning and range of equivalency of the claims are therefore intended to be embraced therein.

The scope and spirit of the present invention are indicated by the appended claims, rather than by the foregoing description.

What is claimed is:

1. A method of manufacturing a gas storage tank for storing a gas, said manufacturing method comprising:
    providing a hollow filling unit and a metal outer wall member that is configured to receive said filling unit therein;
    filling said filling unit with a gas absorbent/adsorbent for absorbing and/or adsorbing the gas;
    attaching a detachable cover member to said filling unit to block up an opening of said filling unit filled with the absorbent/adsorbent, and placing said filling unit filled with the absorbent/adsorbent in said outer wall member through an opening formed in said outer wall member;
    narrowing the opening of said outer wall member after the placement of said filling unit in said outer wall member;
    heat-treating said outer wall member with the narrowed opening followed by water cooling to improve the fatigue strength of said gas storage tank; and
    detaching and removing the cover member from said filling unit housed in said outer wall member after the heat treatment, and
    connecting said filling unit with a supply of gas via the narrowed opening of said outer wall member, so as to allow for storage and release of the gas into and from the absorbent/adsorbent.

2. A manufacturing method in accordance with claim 1, wherein said gas storage tank stores hydrogen,
    the absorbent/adsorbent includes at least a hydrogen storage alloy, and
    said outer wall member is composed of an aluminum-containing metal.

3. A manufacturing method in accordance with claim 2, wherein said filling unit includes a fin structure interiorly, wherein the fin structure comes into contact with the absorbent/adsorbent.

4. A manufacturing method in accordance with claim 3, wherein said filling unit includes the fin structure interiorly, wherein the fin structure is formed by laminating multiple thin plate members having through holes, and
    the absorbent/adsorbent is filled into gaps, wherein the gaps are formed between the multiple thin plate members in said filling unit and are mutually connected via the through holes formed in the multiple thin plate members.

5. A manufacturing method in accordance with claim 1, wherein said filling unit comprises a coolant channel, through which a coolant flows,
    said manufacturing method further comprising:
    connecting the coolant channel with the outside of said outer wall member via the narrowed opening to supply and discharge the coolant to and from the coolant channel.

6. A method of manufacturing a gas storage tank for storing a gas, said manufacturing method comprising:
    placing a filling unit in a tank container having at least one opening, said filling unit containing a gas absorbent/adsorbent for absorbing and/or adsorbing the gas;
    arranging a support member between said filling unit and said tank container to fill a gap formed between said tank container and said filling unit and hold said filling unit within said tank container; and
    heat-treating said tank container followed by water cooling to improve the fatigue strength of said tank container, after the placement of said filling unit and the arrangement of said support member in said tank container, thereby forming said gas storage tank.

* * * * *